United States Patent
Tanay et al.

(10) Patent No.: US 6,487,414 B1
(45) Date of Patent: Nov. 26, 2002

(54) SYSTEM AND METHOD FOR FREQUENCY PLANNING IN WIRELESS COMMUNICATION NETWORKS

(75) Inventors: Amos Tanay, Tel-Aviv (IL); Yuval Davidor, Moshav Avihail (IL)

(73) Assignee: Schema Ltd., Herzlia (IL)

( * ) Notice: Subject to any disclaimer, the term of this patent is extended or adjusted under 35 U.S.C. 154(b) by 0 days.

(21) Appl. No.: 09/636,044

(22) Filed: Aug. 10, 2000

(51) Int. Cl.$^7$ ............................ H04Q 7/20; H04B 17/00
(52) U.S. Cl. ...................... 455/450; 455/446; 455/67.1
(58) Field of Search ................................ 455/450, 451, 455/452, 446, 447, 436, 67.1, 67.3, 422, 509, 513, 296

(56) References Cited

U.S. PATENT DOCUMENTS

| | | | |
|---|---|---|---|
| 3,582,787 A | 6/1971 | Garches et al. | 325/53 |
| 4,128,740 A | 12/1978 | Graziano | 179/2 |
| 4,144,411 A | 3/1979 | Frenkiel | 179/2 |
| 4,144,496 A | 3/1979 | Cunningham et al. | 325/53 |
| 4,384,362 A | 5/1983 | Leland | 455/33 |
| 4,736,453 A | 4/1988 | Schloemer | 455/33 |
| 4,914,651 A | 4/1990 | Lusignan | 370/69.1 |
| 4,965,850 A | 10/1990 | Schloemer | 455/33 |
| 5,038,399 A | 8/1991 | Bruckert | 455/33 |
| 5,067,147 A | 11/1991 | Lee | 379/60 |
| 5,073,971 A | 12/1991 | Schaeffer | 455/33 |
| 5,134,709 A | 7/1992 | Bi et al. | 455/33.1 |
| 5,179,722 A | 1/1993 | Gunmar et al. | 455/33.1 |
| 5,203,012 A | 4/1993 | Patsiokas et al. | 455/34.1 |
| 5,212,831 A | 5/1993 | Chuang et al. | 455/54.1 |
| 5,220,680 A | 6/1993 | Lee | 455/102 |
| 5,247,699 A | 9/1993 | Hartman | 455/33.1 |
| 5,268,694 A | 12/1993 | Jan et al. | 342/354 |
| 5,293,640 A * | 3/1994 | Gunmar et al. | 455/446 |
| 5,307,510 A | 4/1994 | Gunmar et al. | 455/67.1 |
| 5,355,522 A | 10/1994 | Demange | 455/62 |
| 5,375,123 A | 12/1994 | Andersson et al. | 370/95 |
| 5,390,339 A | 2/1995 | Bruckert et al. | 455/33.2 |
| 5,398,276 A | 3/1995 | Lemke et al. | 379/21 |
| 5,404,574 A | 4/1995 | Benveniste | 455/33.1 |
| 5,428,815 A | 6/1995 | Grube | 455/33.1 |
| 5,465,390 A | 11/1995 | Cohen | 455/33.4 |
| 5,475,868 A | 12/1995 | Duque-Anton et al. | 455/62 |

(List continued on next page.)

OTHER PUBLICATIONS

Falcom Evaluation Agreement between Schema Ltd. and US Cellular, May 1999.

Falcom Evaluation Agreement between Schema Ltd. and Cellcom, with Amendment to the Evaulation Agreement, Mar. 1999.

(List continued on next page.)

*Primary Examiner*—Edward F. Urban
*Assistant Examiner*—Erika A. Gary
(74) *Attorney, Agent, or Firm*—Brown Raysman Millstein Felder & Steiner LLP

(57) ABSTRACT

A system and method for frequency planning in a wireless communication network area using an impact matrix which relates signal interference impacts between sectors in a network service are for co-channel and adjacent channel interference. The impact matrix uses weighted propagation analysis and empirical measurement data to determine signal levels within each pixel of a network service area. The system merges the propagation analysis and empirical measurement data according to user assigned confidences.

37 Claims, 10 Drawing Sheets

U.S. PATENT DOCUMENTS

| | | | |
|---|---|---|---|
| 5,490,285 A | 2/1996 | Ahlenius et al. | 455/33.1 |
| 5,491,837 A | 2/1996 | Haartsen | 455/62 |
| 5,497,503 A | 3/1996 | Rydberg et al. | 455/33.1 |
| 5,551,064 A | 8/1996 | Nobbe et al. | 455/62 |
| 5,583,886 A | 12/1996 | Rohani et al. | 375/227 |
| 5,602,903 A | 2/1997 | LeBlanc et al. | 379/60 |
| 5,668,562 A | 9/1997 | Cutrer et al. | 343/703 |
| 5,710,758 A | 1/1998 | Soliman et al. | 370/241 |
| 5,737,705 A | 4/1998 | Ruppel et al. | 455/452 |
| 5,740,536 A | 4/1998 | Benveniste | 455/447 |
| 5,794,157 A | 8/1998 | Haartsen | 455/522 |
| 5,809,401 A | 9/1998 | Meidan et al. | 455/63 |
| 5,815,813 A | 9/1998 | Faruque | 455/446 |
| 5,878,328 A | 3/1999 | Chawla et al. | 455/67.1 |
| 5,884,147 A | 3/1999 | Reudink et al. | 455/67.1 |
| 5,915,219 A | 6/1999 | Poyhonen | 455/435 |
| 5,926,762 A * | 7/1999 | Arpee et al. | 455/447 |
| 5,966,657 A | 10/1999 | Sporre | 455/425 |
| 5,970,394 A | 10/1999 | Arpee et al. | 455/67.1 |
| 6,021,329 A * | 2/2000 | Kornestedt et al. | 455/446 |
| 6,128,497 A | 10/2000 | Faruque | 445/447 |
| 6,137,991 A * | 10/2000 | Isaksson | 455/67.1 |
| 6,154,655 A | 11/2000 | Borst et al. | 455/451 |
| 6,178,328 B1 | 1/2001 | Tang et al. | 455/447 |
| 6,198,910 B1 | 3/2001 | Hanley | 455/67.1 |
| 6,212,386 B1 | 4/2001 | Briere et al. | 455/477 |
| 6,188,914 B1 | 2/2002 | Chheda | 455/562 |

OTHER PUBLICATIONS

Falcom Evaluation Agreement between Schema Ltd. and Nextel, Jan. 1999.

Services Agreement between Schema Ltd. and Cellcom, Jun. 1999.

Software License Agreement between Schema Ltd. and Cellcom, Jun. 1999.

Software Maintenance Agreement between Schema Ltd. and Cellcom, Jun. 1999.

Consultant and Trial Agreement between Cellco Partnership and Schema Ltd., including Attachments A and B to Exhibit A, Exhibit C, Dec. 1998, with Amendment No. 1 (Jan. 1999) and Amendment No. 2 (Feb. 1999).

Amitay, et al., *IEEE Transaction on Vehicular Technology*, vol. 41, No. 4, pp. 414–416, Nov. 1992.

Arredondo et al., *The Bell System Technical Journal*, vol. 58, No. 1, pp. 97–122, Jan. 1979.

Catedra et al., "Cell Planning for Wireless Communications" pp. xi–4, 151–185, Feb. 1999.

Chadha et al., *The Bell System Technical Journal*, vol. 58, No. 1, pp. 71–95, Jan. 1979.

DiPiazza et al., *The Bell System Technical Journal*, vol. 58, No. 1, pp. 215–248, Jan. 1979.

Drucker, Elliot H., *Cellular Business*, vol. 11, No. 12, pp. 46–52, Nov. 1994.

Fisher et al., *The Bell System Technical Journal*, vol. 58, No. 1, pp. 153–199, Jan. 1979.

Fisher, R. E., *The Bell System Technical Journal*, vol. 58, No. 1, pp. 123–143, Jan. 1979.

Fluhr et al, *The Bell System Technical Journal*, vol. 58, No. 1, pp. 43–69, Jan. 1979.

Forrest, Robert T., *IEEE Transactions on Vehicular Technology*, vol. VT–24, No. 4, pp. 46–53, Nov. 1975.

Huff, D.L., *The Bell System Technical Journal*, vol. 58, No. 1, pp. 249–269, Jan. 1979.

Lee, William C.Y., *Cellular Business*, vol. 9, No. 3, p. 52, Mar. 1992.

Lee, William C.Y., $35^{th}$ *IEEE Vehicular Technology Conference*, pp. 67–72, May 1985.

Lee, William C.Y., *IEEE Transactions on Vehicular Technology*, vol. VT–36, No. 4, pp. 188–192, Nov. 1987.

Lee, W.C.Y., $38^{th}$ *IEEE Vehicular Technology Conference*, pp. 643–646, Jun. 1988.

Lee, William C.Y., *IEEE Transactions on Vehicular Technology*, vol. 38, No. 2, pp. 69–75, May 1989.

Lee, William C.Y., *Mobile Cellular Telecommunications*, McGraw–Hill Book Company, $2^{nd}$ Ed., pp. 189–192 & 225, 1995.

Lee et al., *The Seventh IEEE International Symposium on PIMRC*, pp. 286–290, Oct. 1996.

Lee, William C. Y., *Telephony*, vol. 209, No. 20, pp. 82–92, Nov. 1985.

Lee, William C.Y., *Proceedings of the Workshop on Advanced Network and Technology concepts for Mobile, Micro, and Personal Communications*, pp. 197–206, Sep 1991.

Lee et al., *IWMC*, pp. 1–5, Sep., 1996.

Lee, W.C.Y., *Cellular Business*, vol. 9, No. 7, p. 44, Jul. 1992.

Lee, W.C.Y., *Cellular Business*, vol. 9, No. 4, p. 60, Apr. 1992.

Lee, William C.Y., *Electro International, Conference Record*, pp. 519–520, Apr. 1991.

Lee, William C.Y., $2^{nd}$ *ICUPC*, pp. 466–470, 1993.

Lee, W.C.Y., $42^{nd}$ *VTS Conference Frontiers of Technology*, pp. 343–348, May 1992.

Lu et al., *1995 IEEE International Conference on Communications*, pp. 708–712, Jun. 1995.

MacDonald, V.H., *The Bell System Technical Journal*, vol. 58, No. 1, pp. 15–41, Jan. 1979.

Tsiang, S.H., *The Bell System Technical Journal*, vol. 58, No. 1, pp. 201–213, Jan. 1979.

Walker, J.T., *The Bell System Technical Journal*, vol. 58, No. 1, pp. 145–153, Jan. 1979.

Young, W.R., *The Bell System Technical Journal*, vol. 58, No. 1, pp. 1–14, Jan. 1979.

*Cellular Business*, "Field Measurement " Sep. 1990.

*IEEE Transactions on Vehicular Technology*, vol. 37, No. 1, pp. 45–53, Feb. 1988.

*Cellular Measurement Analyst*, User's Manual, 1996.

\* cited by examiner

P1 (S1v.S2; S1v.S3; S1v.S4)
P2 (S1v.S2; S1v.S3; S1v.S4)
P3 (S1v.S2; S1v.S3; S1v.S4)
P4 (S1v.S2; S1v.S3; S1v.S4)

SYSTEM AND METHOD FOR FREQUENCY PLANNING IN WIRELESS COMMUNICATION NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to the field of frequency planning in wireless communication networks and, in particular, to a system and method for improved consideration of the impact of various factors in frequency planning.

In wireless communication systems, such as a cellular mobile radio communication system, the geographic area served by the system is divided into geographically defined cells. In the system, there is a finite number of carrier frequency channels, typically radio-frequency (RF) channels, that are available for use during communications in and between network areas cells. Typically, a frequency group, consisting of a subset of all of the available frequencies, is assigned to each cell for that cell's use during communications.

However, because the number of frequency groups is limited, it is necessary to reuse them within the area served by the system. To provide for a greater coverage by the system, and to provide for greater capacity through higher reuse of frequency groups, the network service area cells may be further divided up into sectors. Because the use of a particular frequency by two different sectors can result in interference during a call or even result in the call being completely cut-off or "dropped", an effort must be made to assign frequency groups to sectors in a manner that minimizes the amount of interference.

In wireless communication networks, there are two primary types of interference: co-channel interference and neighbor or adjacent channel interference. Co-channel interference is the interference from communication sources tuned to the same frequency as the operating channel. Adjacent-channel interference comes from communication sources using channels near the operating channel in the frequency domain. To achieve the desired voice or data transmission quality, the ratio of the received signal over the combined co-channel and neighbor-channel interference must be above a specified threshold. Such channel interference can be up-link or down-link interference or a combination of these interferences. Down-link interference is channel interference received at regions serviced by a first base station caused from signals transmitted by other base stations. Up-link interference is interference at the base stations caused from signals transmitted by mobile units in regions of the coverage area that are not serviced by that base station.

Furthermore, other factors such as antenna patterns, power levels, scattering, and wave diffraction variations combined with buildings, various other structures, hills, mountains, foliage, and other physical objects contribute to the interference experienced during wireless communications.

In frequency planning for a wireless communication network, the primary task is to try to predict and attempt to reduce the amount of channel interference experienced by strategically assigning certain channels to certain sectors. Typically, this can be achieved by assigning frequencies so that the distance between co-channel and adjacent channel sectors is maximized. In this context, "distance" does not necessarily refer to geographic distance but connotes a distance in the RF sense. That is, although sectors far apart from each other geographically are less likely to "see" each other, they can still interfere with each other. For example, a high sector can interfere with a sector as far as hundreds of miles away. Maximizing this distance decreases the chances of the sectors conflicting with one another in the airwaves. However, a severe consequence of maximizing this distance is that it effectively reduces the amount of channel combinations possible in the network service area, thereby limiting the amount of coverage available for wireless communication. Typically, frequency planning is ordinarily accomplished by three primary techniques including channel sets, reuse patterns and pixel based interference analysis.

Channel sets are non-overlapping subsets of the available channels organized according to a periodic frequency spacing in terms of number of channels between, members of a given set. The principal disadvantage of using channel sets is that the number of channels required from sector to sector usually varies, and optimal frequency planning will require that just that number, rather than the number in an arbitrary set, be assigned to each sector.

In the reuse pattern scheme, the sectors in a network are arranged in a two-dimensional pattern, or "grid". Channels or, more commonly, channel sets, are then assigned so that co-channel or adjacent channel assignments appear periodically in different sectors. The primary disadvantage of frequency planning based upon a reuse grid is that, within a given network, varying terrain and man-made "clutter", such as buildings and other structures, will affect the characteristics of radio propagation and attenuation. Therefore, adhering to a fixed and rigid co-channel or adjacent channel spacing on a grid will likely provide inadequate isolation in some cases, resulting in excessive interference, and more than the required isolation in others, thereby reducing reuse efficiency. Furthermore, in addition to less than optimal interference levels, the fixed reuse approach results in much reduced capacity in many parts of the network where frequencies can be added freely due to an RF shield, such as a mountain ridge, but the grid prohibits such an assignment.

In pixel based interference analysis, the entire network service area is divided into a large number of very small "pixels" or "bins". In one example, each pixel would be a 100 meter square, so that a network service area of 100 kilometers by 100 kilometers would contain 1 million pixels. For each pixel, a system engineer will ascertain the strongest incident signal level from the sectors nearby and then the incident signal levels from each of the other sectors in the network to determine potential interferences. From this information, the system engineer can determine the predicted levels of co-channel or adjacent channel interference that would be present in that pixel if certain sectors were assigned, respectively, the same radio channels as the serving sector or channels adjacent to those in the serving sector.

However, pixel-by-pixel interference analysis also has many significant limitations. While pixel by pixel analysis can predict interference problems that are likely to result from a proposed frequency plan, it does not provide any such plan in the first place, nor does it inherently suggest modifications to a frequency plan that would reduce interference.

Furthermore, there is an inherent limitation on the amount of data that can be presented in pixel by pixel interference analysis. At the same time, pixel by pixel analysis produces an amount of data which is not easily susceptible to human interpretation. Finally, because conventional pixel by pixel interference analysis relies solely on predicted levels, it carries over the inaccuracies in such data as described above and results in erroneous frequency assignments.

Thus, while these existing techniques can provide for some measure of protection and relief from channel interference in the network service area, they still fail to account for the many variables and factors which can affect wireless communications on a day to day basis. Accordingly, it would be desirable to have a system and method for frequency planning within a wireless communication network which accounts for the many variables and factors affecting the quality of wireless communications, reduces the interference experienced during wireless communication, and does not limit the coverage area of network cells.

SUMMARY OF THE INVENTION

The present invention provides a system and method for creating an impact matrix for use in allocating frequency channels in a wireless communication network service area which is divided into a plurality of sectors and further divided into a plurality of pixels. The impact matrix provides impact scores which characterize the impact of making certain co-channel or adjacent channel assignment in pairs of sector by sector within a network service area.

The impact scores are developed by a series of steps, the first of which involves selectively merging signal propagation analysis data and empirical measurement data to determine an anticipated signal level for each one of the plurality of pixels in the network area. Once the signal levels within each pixel are obtained, a determination is made as to which sector within the network service area is serving that particular pixel. The system then assigns a weighted channel interference impact score for the pixel based on the interference between the pixel's signal serving sector and signals from each of the other non-serving sectors in the network area. Overall sector by sector impact scores based on the weighted channel interference impact scores are determined for all of the pixels for which a sector is the serving sector.

In one embodiment of the present invention, the signal level data from the signal propagation analysis, empirical measurement, and switch logs analysis is merged according to user assigned confidences for the data. The step of determining a weighted channel interference impact score between the pixel's signal serving sector and signals from each of the other sectors in the network area includes calculating a ratio between a signal level from the serving sector and signal levels from each of the other sectors in the network area, assigning interference impact scores for each of the other sectors in the network area, and adjusting the interference impact scores according to user assigned factors such as network area sensitivity to call quality and amount of call volume for that network area.

Once the impact matrixis developed, the scores-in the matrix may be modified to further accurately characterize the signal impacts of interferences within a network service area. The impact matrix scores may be adjusted according to data which may have been previously input to the system or may be contemporaneously input. Such data includes channel pairing relationships among sectors which are known to provide low levels of excessive interference, channel pairing relationships among sectors which are known to provide high levels of excessive interference, and detailed call history information. Detailed call history information can include data on dropped calls and associated sector and channel combination where call drops occur.

The impact matrix may then be used for frequency planning in the network service area. The impact matrix will provide a user, typically a network engineer, with a way to predict the signal quality impact of certain channel assignments within the network service area.

DETAILED DESCRIPTION OF THE PREFERRED EMBODIMENTS

Figure 1:
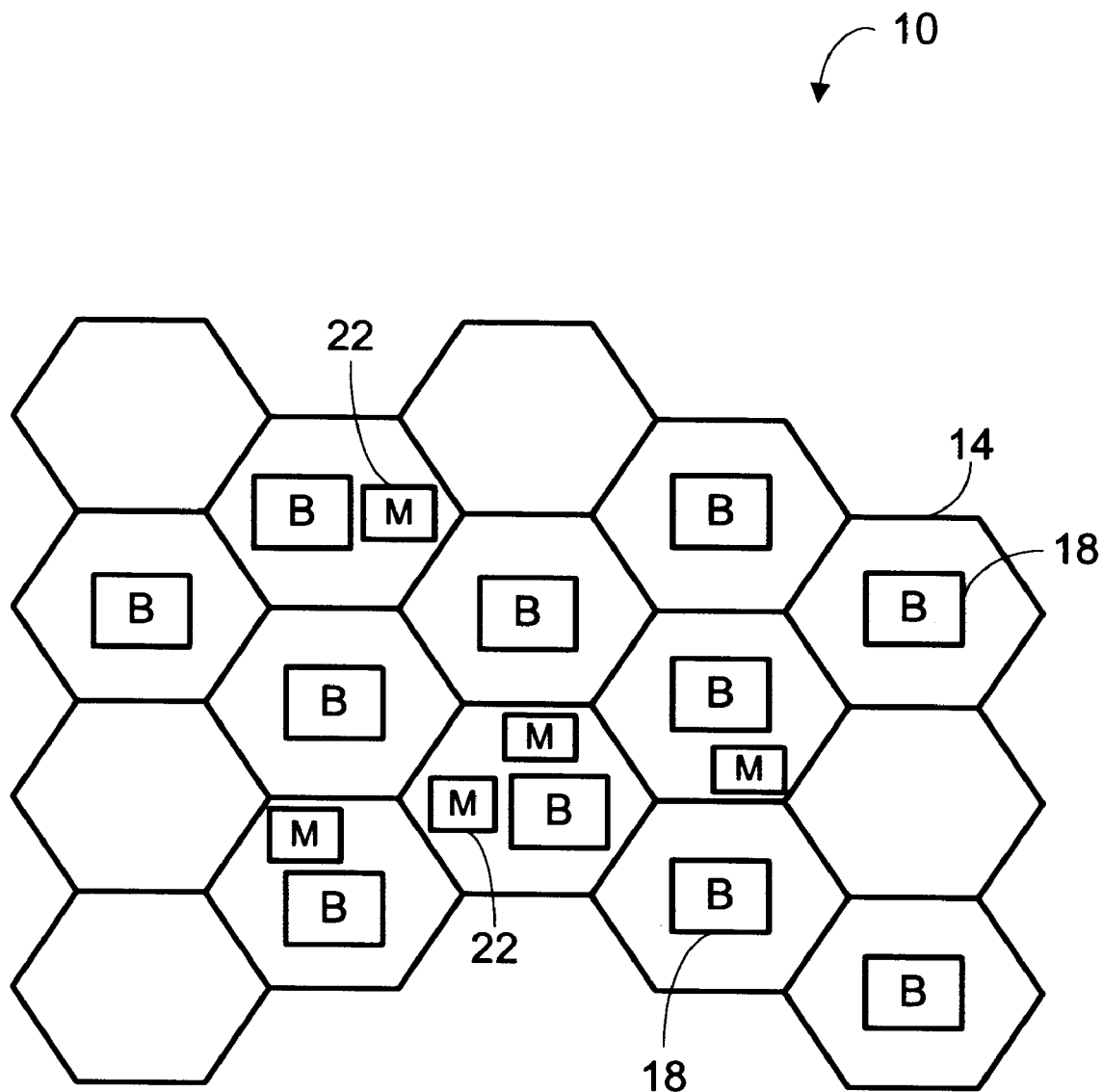
FIG. 1 illustrates a wireless communications network service area which is divided into cells.

Referring to FIG. 1, there is shown a schematic layout of a wireless communications network service area 10 divided into cells 14. It should be understood that the hexagonal shape of cells 14 depicted in FIG. 1 merely represents a drawing convention. Such a hexagonal cell representation has been chosen because it approaches a circular shape that is the ideal power coverage area for a wireless communications network service cell. Use of such circular shapes would involve overlapped areas and make a drawing of the served area unclear. With the hexagonal shaped cell convention, on the other hand, the plurality of cells representing a service area can be depicted with no gap and no overlap between cells. Generally, a typical wireless network would have far more than the illustrated number of cells but the numbers shown are sufficient for illustrative purposes.

As shown in FIG. 1, each cell 14 contains base stations 18 which are located toward the center of each cell 14. Typically the base stations employ omni-directional antennas, while base stations located toward a cell boundary typically employ directional antennas. Operating within a communications service area are typically, a large number of mobile telephone stations, or mobiles 22. At any given point in time, a subset of these mobiles will be engaged in calls.

Figure 2:
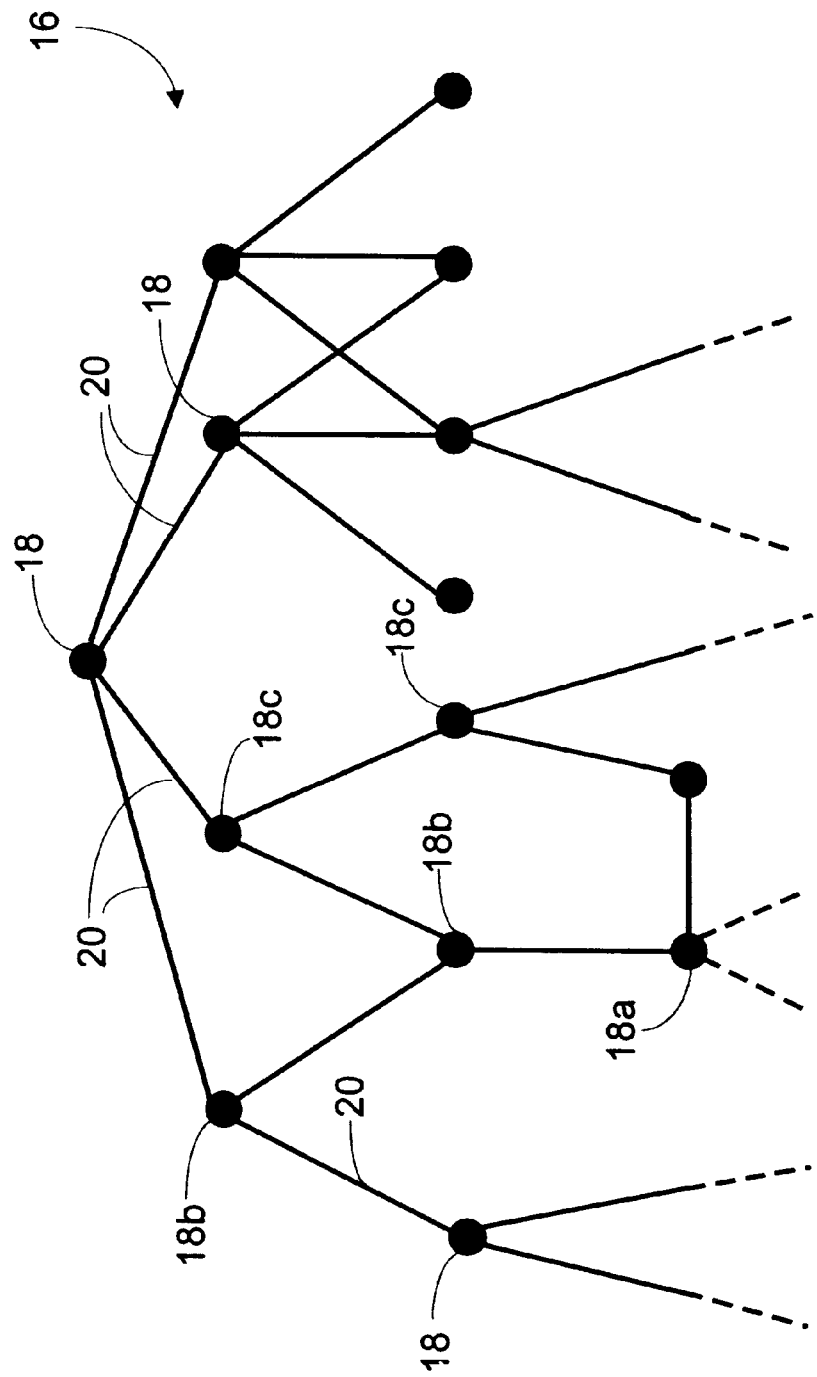
FIG. 2A illustrates a network service area cell of FIG. 1 divided into sectors.
FIG. 2B is a detailed illustration of portion A in FIG. 2A showing a sector divided into pixels.
Figure 2A:
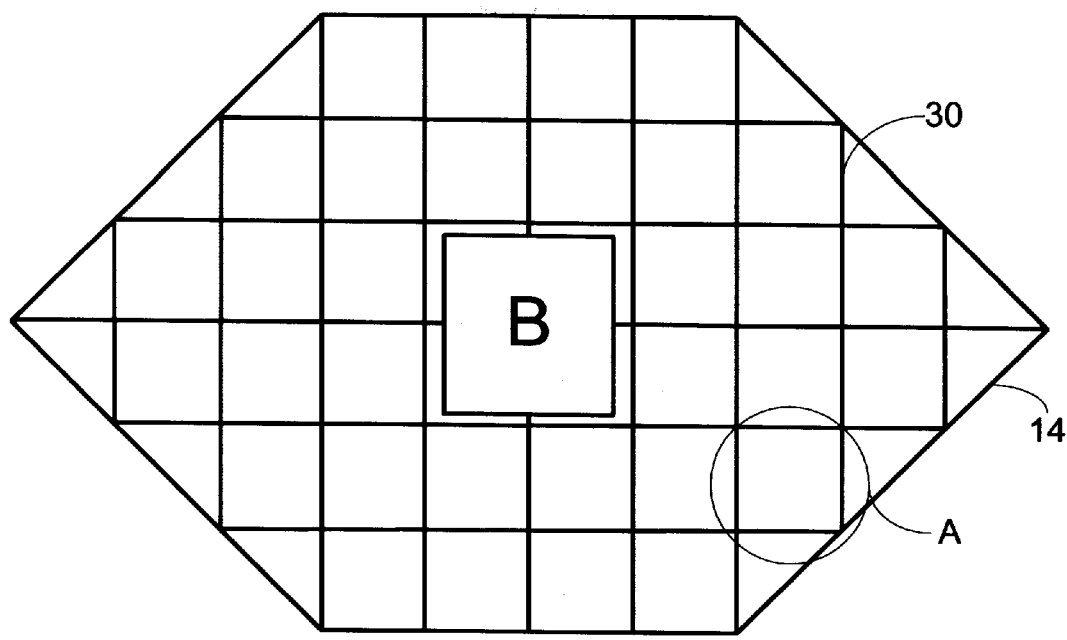
Figure 2B:
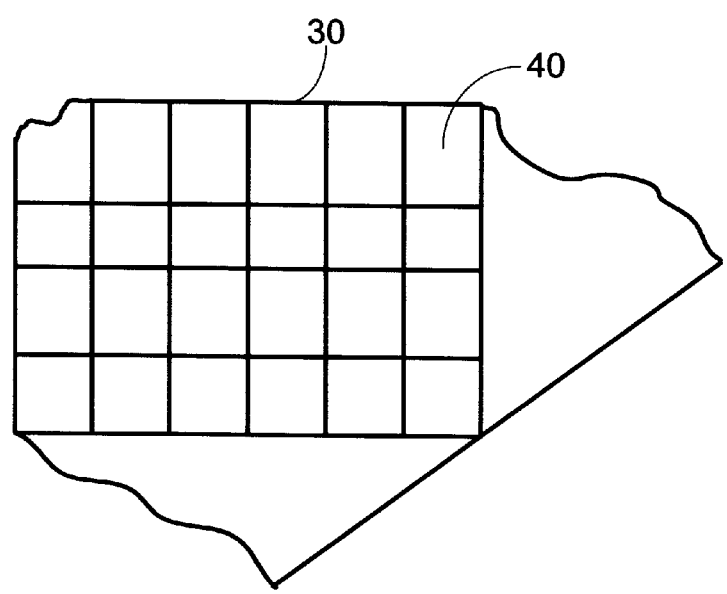

As shown in FIG. 2A, each cell 14 in the wireless communication network service area may be divided further into sectors 30 to improve the coverage or maximize the reuse factor without increasing the interference level of the available frequency channels. Additionally, as shown in FIG. 2B, the network service area may be further divided into pixels 40 to assist in analyzing communication signal quality and interference on a more detailed basis. Typically, during wireless communications, the communicating mobile 22 will be assigned a particular frequency channel in the sector within which the mobile 22 is currently operating. If the mobile 22 moves from one sector which is currently servicing the communication, the "serving sector", to another sector which takes over the servicing of the communication, the "target sector", a "handoff" occurs in which the mobile 22 is assigned a new frequency channel from those available in the target sector.

In the present invention, the frequency channels correspond to the frequencies in approximately the 800 MHz band to the 1900 MHz band. The invention is intended for use in a system such as a Netplan system for the purpose of facilitating frequency planning for digital and/or analog channels, the invention will work in a dual mode system where analog and digital frequencies share the spectrum in each cell. The present invention is applicable to, but not limited to, "Advanced Mobile Phone System" ("AWS"), "Total Access Communications System" ("TACS"), "Nordic Mobile Telephone" ("NMT"), "Time Division Multiple Access" as defined by the Telecommunications Industry Association (TIA) interim standard IS-136 ("TDMA"), and "Global System for Mobile" ("GSM") protocols.

Figure 3:
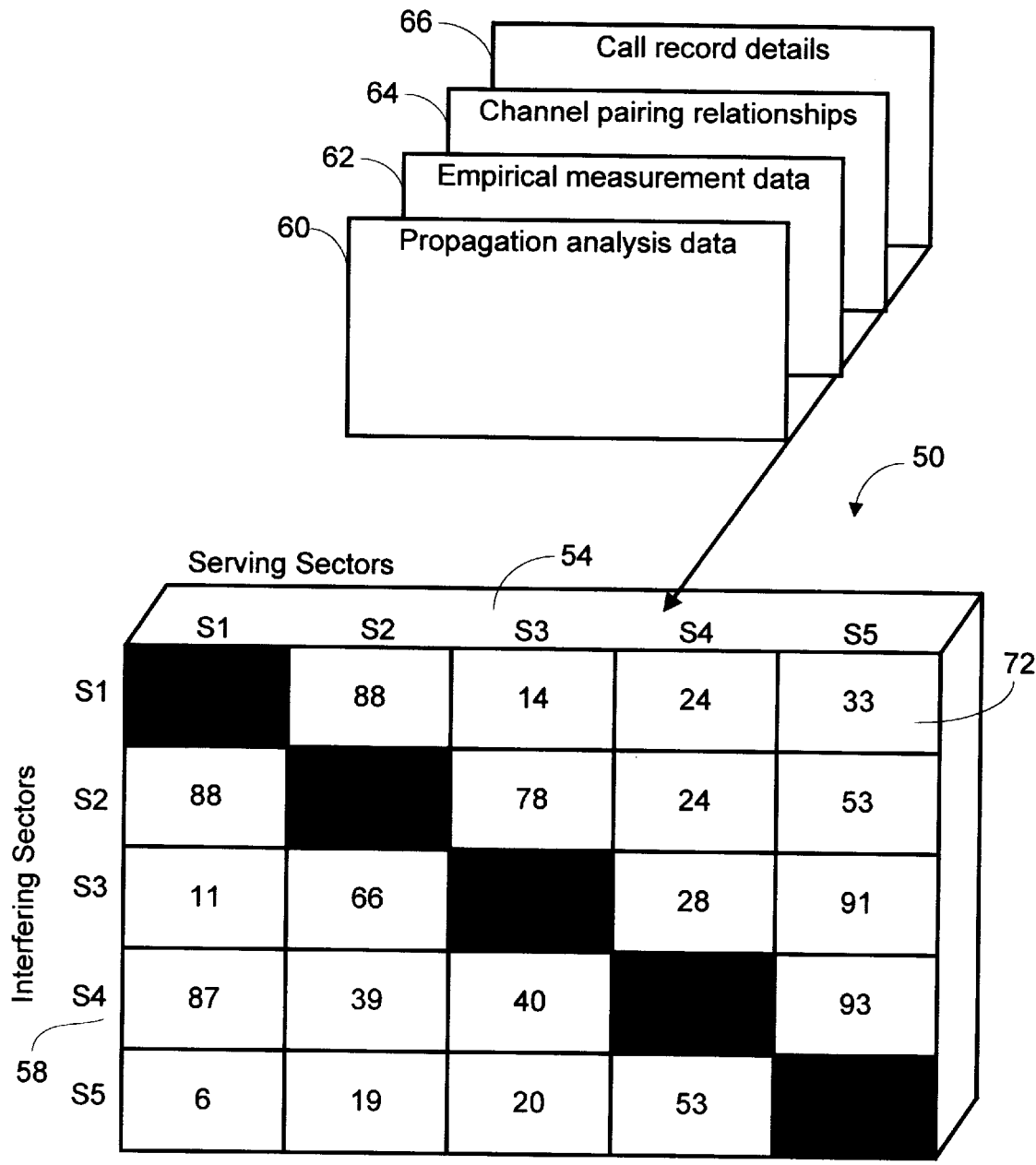
FIG. 3 illustrates an exemplary impact matrix developed in accordance with the teachings of the present invention.

Referring to FIG. 3, the system and method of the present invention develops and generates an impact matrix 50 for use in frequency planning for a wireless communication network service area. Generally, the impact matrix 50 is a representation of the potential signal quality impact of making certain co-channel or adjacent channel assignments between two sectors within a wireless network, such as a cellular telephone network. It is contemplated that the impact matrix may also be organized by pixel by pixel and/or a cell by cell rather than sector by sector. In a preferred embodiment of the present invention, two main matrices are developed, one which addresses the impact of co-channel interference and the other which addresses the impact of adjacent channel interference. The methods and processes shown and described herein will be applicable to either co-channel or adjacent channel interference determinations and measurements. In addition, the impact matrix is independent of the frequencies used in the wireless system, as long as the system works within a given interval such as, in one embodiment, a 100 MHz interval. Two impact matrices would be developed for use in a dual band network.

In the impact matrix, the columns 54 represent specific serving sectors in the network service area and the rows 58 represent interfering sectors in the network service area. A sector is considered to be a serving sector if, at a given point, the sector is currently providing the communications link to the mobile unit. The interfering sectors or "non-serving" sectors may be any sector within the network service area which may cause interference in the serving sector by virtue of a co-channel or adjacent channel assignment in that non-serving sector. For example, if a serving sector, denoted for exemplary purposes as sector $S_1$ is assigned a channel X, and one other sector $S_2$, within the network service area is also assigned channel X, then sector $S_2$ will be considered a potentially interfering sector.

In a preferred embodiment, the impact matrix will typically be of the dimension Q by Q, where Q is equal to the number of sectors in the network. In other embodiments, Q may include some sectors in neighboring networks which might interfere with, or be subjected to, interference from sectors that lie near the edge of the actual network service area under consideration. In such a case, the impact matrix should still be kept as a square by using null data in fields representing neighboring networks as serving sectors.

Generally, the impact matrix is developed by performing various signal quality measurements on a set of frequency channels in a network service area cell and adjusting the signal quality measurements based on a variety of factors or signal impacts, as discussed in more detail herein. In an exemplary embodiment, signal quality measurements are made not only for those frequency channels in use or available for use, but also for those frequency channels that are not currently being used or available for use, though they may become available at a later time. These various signal quality measurements are processed, filtered, and evaluated, as described in greater detail below, and used as a basis for changing assignments of frequency channels.

The impact matrix 50 contains impact scores 72 which relate, on a sector by sector basis, the overall quality impact of making certain channel assignments in certain sectors pairings. Take, for example, the specific pairing of serving sector $S_2$ (column $S_2$) and interfering sector $S_3$ (row $S_3$). An impact score of "66" is given to the pairing of serving sector $S_2$ and interfering sector $S_3$ in the impact matrix of FIG. 3. The "66" represents the overall quality impact in areas served by sector $S_2$ when a co-channel or adjacent channel assignment is made in sector $S_3$. The scores 72 as shown in FIG. 3 are merely represented on a scale from one to ninety-nine for exemplary purposes only. It is contemplated that any numeric scale may be used in developing the impact matrix, such as a one to ten scale or any other similar scale which can provide for a relative rating in the matrix. In developing the impact scores, the system and method of present invention allow multiple data "layers" to be applied and merged so as to more accurately represent the potential signal interference impacts between sectors.

As shown in FIG. 3, in creating the impact matrix of the present invention, a number of data files or "layers" are used to provide data for development of the impact matrix. In some embodiments, such data includes output files from computer RF propagation analyses 60, output files from empirical measurements 62, files containing or implying lists of co-channel and/or adjacent channel pairing relationships among various sectors 64, and files which provide details of call records for the network for some period of time 66. Other types of data or output files may be used in accordance with the teachings of the present invention, where the data may affect the signal quality within the network service area. The system and method of the present invention are scalable so that any number of data layers are able to be incorporated into the overall impact matrix. In the present system, each of these data types or files constitutes a "layer" for eventual incorporation into an overall unified impact matrix.

Figure 4:
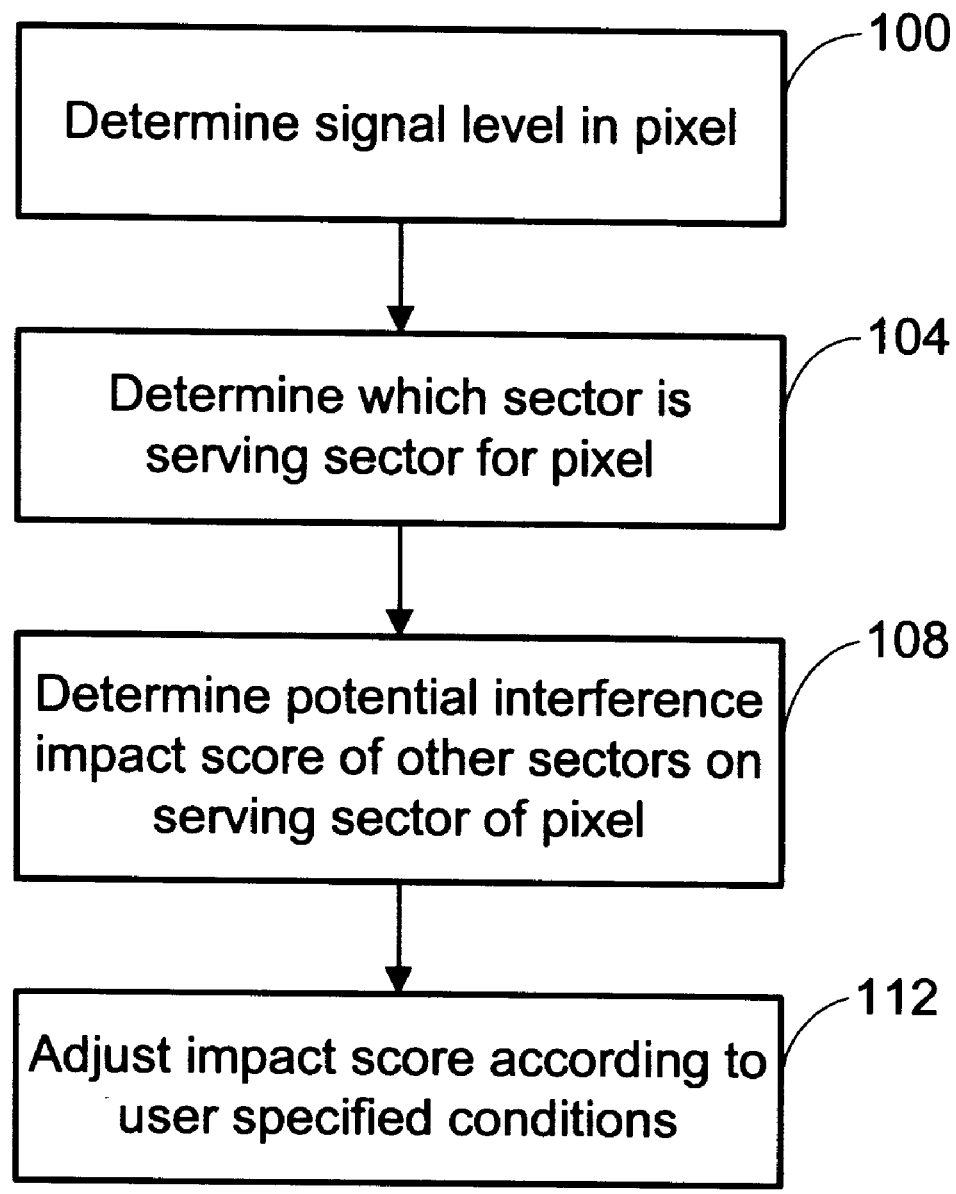
FIG. 4 is a flow chart illustrating a process for determining interference impact scores for use in developing the impact matrix.

As shown in FIG. 4, in one embodiment of the present invention, the development of the impact matrix generally begins with a determination of signal levels within the network service area, step 100 Once signal level information is obtained and calculated, it is determined which sector within the network service area is the serving sector for a particular pixel, step 104. Once the serving sector is identified, the potential interference of other sectors on this serving sector is quantified by way of an interference impact score assigned to that specific pairing,of serving sector and interfering sector, step 108. Finally, the interference impact scores are adjusted according to some user inputtable variables and factors, step 112. The steps of the process shown in FIG. 4 will be now discussed in more detail below.

Figure 5:
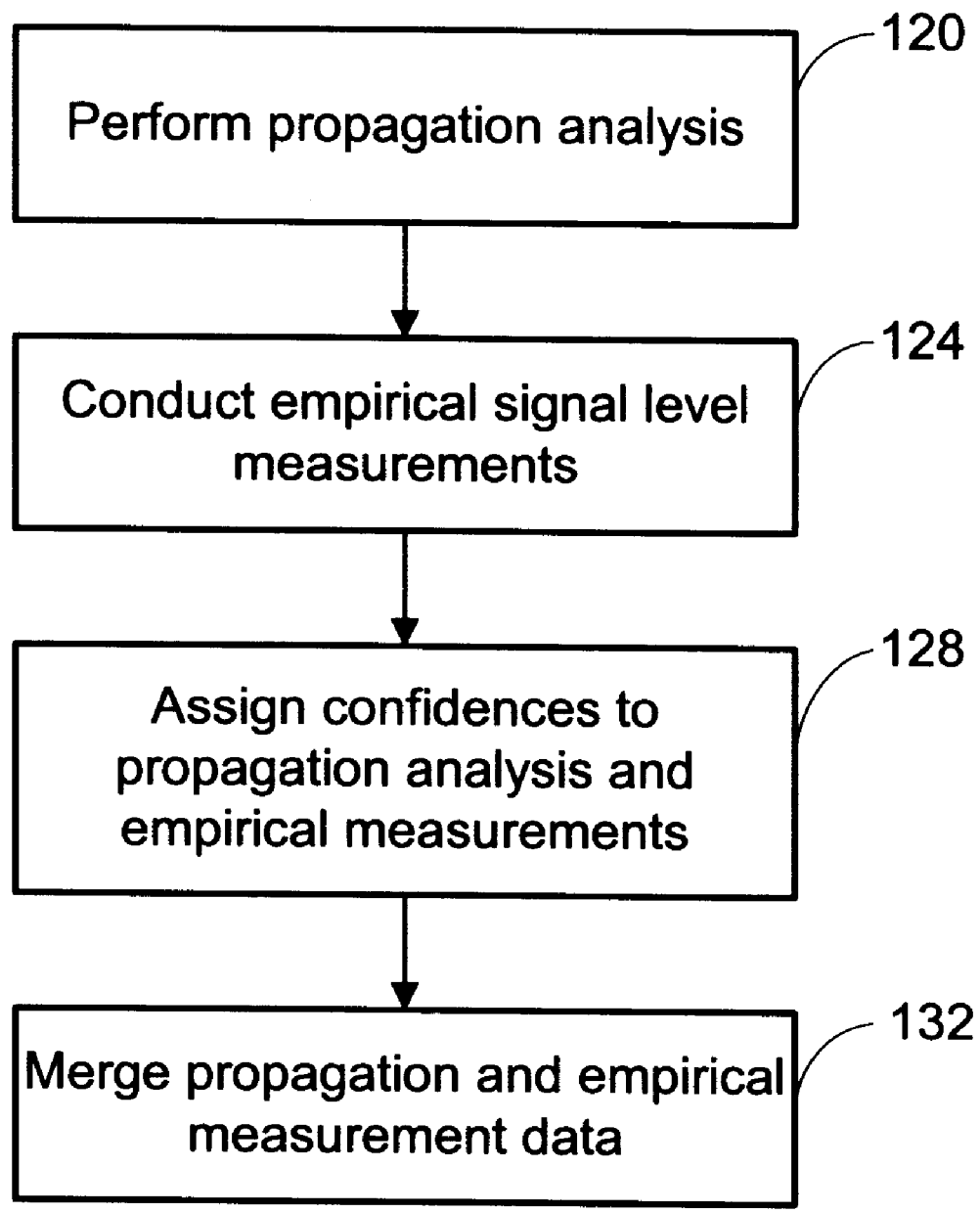
FIG. 5 is a flow chart illustrating a process for determining a signal level within a pixel in the service area.

Referring now to FIG. 5, in constructing the impact matrix, the system of the present invention endeavors to determine the signal level within each pixel of the network service area. The process begins with a basic RF propagation analysis for the network service area, step 120. By way of background, the RF propagation analysis is typically based on signal predictions which take into account area topology, antenna heights, transmit power levels and even extant man-made clutter, such as building, bridges, etc. Such propagation predictions are most often perform d by computer simulation programs running specially designed RF propagation analysis software, such as MSI's Plantet, Motorola's Netplan, or LCC's CellCard. After RF propagation analysis is performed, empirical measurement data is collected to provide additional information about signal levels within each pixel in the network service area, step 124. Collecting empirical signal level measurements typically are made by a receiver provided either in a mobile unit, such as car or in a hand held scanner, which scans discrete channels being transmitted by the various sectors. The measurement receiver is moved about in the network to collect signal level data in a large number of pixels, often in the form of so-called "drive tests".

Once the propagation analysis and empirical measurements are completed, confidences may be assigned to the signal level data, step 128. For example, if it is known that for a certain area the RF propagation analysis data will be incorrect or skewed, a user may assign more confidence to the empirical measurement data for that certain area. Conversely, if it is known-that for another service area, the empirical measurement information is somehow inaccurate because, or example, of possible physical/environmental clutter which may affect the empirical readings, then the user may assign more confidence to the RF propagation analysis information in that instance.

In one embodiment, a two-dimensional representation of the network service area in map format is provided to a user, on which the user can "draw" such areas as polygons or other arbitrary shapes using a "mouse" or other pointing device to designate areas to which to assign confidences to either the propagation or empirical measurements. The user may also simply assign confidence ratings to either the propagation analysis or empirical measurement information. Such ratings may be simply a one to ten rating or any scale which can rate the data on a relative basis. In such an example, the signal level data which the user has the most confidence in will be assigned a "10" and the data which the user has the least confidence in will be assigned a "1."

Once confidences are assigned, the system merges propagation analysis and empirical measurement information, step 132, in accordance with confidences assigned by the user. In an exemplary, embodiment, the basic logic for the merging of the propagation analysis data and the empirical measurement data is accomplished according to the following pseudo-code:

```
for current_point = {points in drive-test} {
for freq. ={frequencies measured in current frequency {
for each antenna transmitting at the current frequency {
using some basic RF prediction model, calculate the
predicted signal strength in the drive test point
region (~500 m radius), apply a geometric correlation
test to the sampled and predicted measurements. Store
the correlation index.
iterate to next antenna
}
if none of the antennas satisfied some minimal correlation threshold
go to frequency loop
```

-continued

```
take the antenna with the best correlation index and declare it
as the transmitter of the current frequency at the current point.
iterate to next frequency
}
iterate to next point
}
```

The merging of propagation analysis and empirical measurement information is done as a preliminary step in determining which sector in the network service area is serving a current pixel. This is accomplished by first determining which antenna in the network service area is transmitting the current signal being measured at the current pixel (current_point). The process for determining signal levels within a network service area is basically accomplished by the nested series of loops, as shown above, whereby readings are taken at a certain point (pixel) within the network service area, then at each point a certain frequency is measured, then for that certain frequency, the different antennas transmitting at that frequency are examined.

Essentially, a point by point (current_point) frequency signal analysis is conducted for all the points in the empirical test (points in drive_test). At each point, frequencies are measured (frequencies measured in current_point) to determine viable frequencies at that point. Then, for each antenna transmitting at the current frequency, the predicted signal strength is determined using basic RF prediction model data. A geometric correlation test is applied to the currently empirically sampled signal measurement and the predicted signal strength measurement to determine a correlation index. This correlation index is then stored. This process of determining and storing a correlation index is repeated for each antenna transmitting at the current frequency. If none of the antennas satisfy a minimal correlation threshold, the next frequency at the current point is examined. This process is then repeated for the next point or pixel in the empirical measurement analysis.

Once at least two correlation indices are determined for the frequency at the current point, the at least two indices are compared and the antenna with the "best" correlation index is determined to be the transmitter of the current frequency at the current point. The "best" correlation index is obtained for the antenna with the best match between the prediction and sample and whose complete set of frequencies is measured in a coordinated way. After this determination is made for the current frequency, the system iterates to the next frequency and repeats the above process of determining the transmitter of the frequency.

Having merged the RF propagation analysis and empirical measurement data for every pixel in the network service area, the system now has a signal strength per pixel file in which, for each pixel in the network, the anticipated incident signal levels from each sector are retained. Those skilled in the art will appreciate that typically, in each pixel, the anticipated signal level from the vast majority of the sectors in the network will be below a thermal noise floor, and may thus be disregarded. Typically, the thermal noise floor will be approximately at or below 130 dB.

Referring back to FIG. 4, the present system and method identifies, in each pixel, the associated serving sector for that pixel, step 104. The probability of a mobile being served by a given antenna at a given point depends in part on the RF propagation layer, e.g., the signal strength of each antenna at each point, and also in the logical organization of the network which takes into account factors such as the handoff regulation algorithm and parameters. The following pseudo-code demonstrates the basic logic employed in an exemplary embodiment for determining which will be the serving sector for a given pixel or point in the network service area:

```
for current_point = {points in sample} {
  calc the best server in current_point.
  calc the best server signal strength at current_point.
}
for current_sector = {sectors in the network} {
  for neighbor = {neighbors to current_sector) {
    flow = number of times user handoff between current_sector and
    neighbor.
    Simulate user movements and the handoff process (using
    the specific system handoff algorithm) and update the service
    probabilities in non-best server areas (known as handoff zone).
  }
}
```

In an exemplary embodiment, the system determines for the current pixel (current_point) out of all the pixels in the network service area (points in sample), the best server for the current_point and the best server signal strength at the current_point, as described above. Then for the current sector (current_sector) out of all the sectors in the network, each neighboring sector (neighbors to current_sector) is examined based on the flow, user movements and the handoff process to determine service probabilities for each of the sectors. The system predicts, taking into account the system specific handoff algorithm which may vary between communication systems, which sector will serve a given pixel based on the handoff performance between the current_sector and neighboring sectors (neighbors to current_sector.) Thus, a sector will likely be a serving sector for a given pixel, if the sector both provides a strong signal to a given pixel and also actively coordinates handoffs in that given pixel's area.

Figure 6:
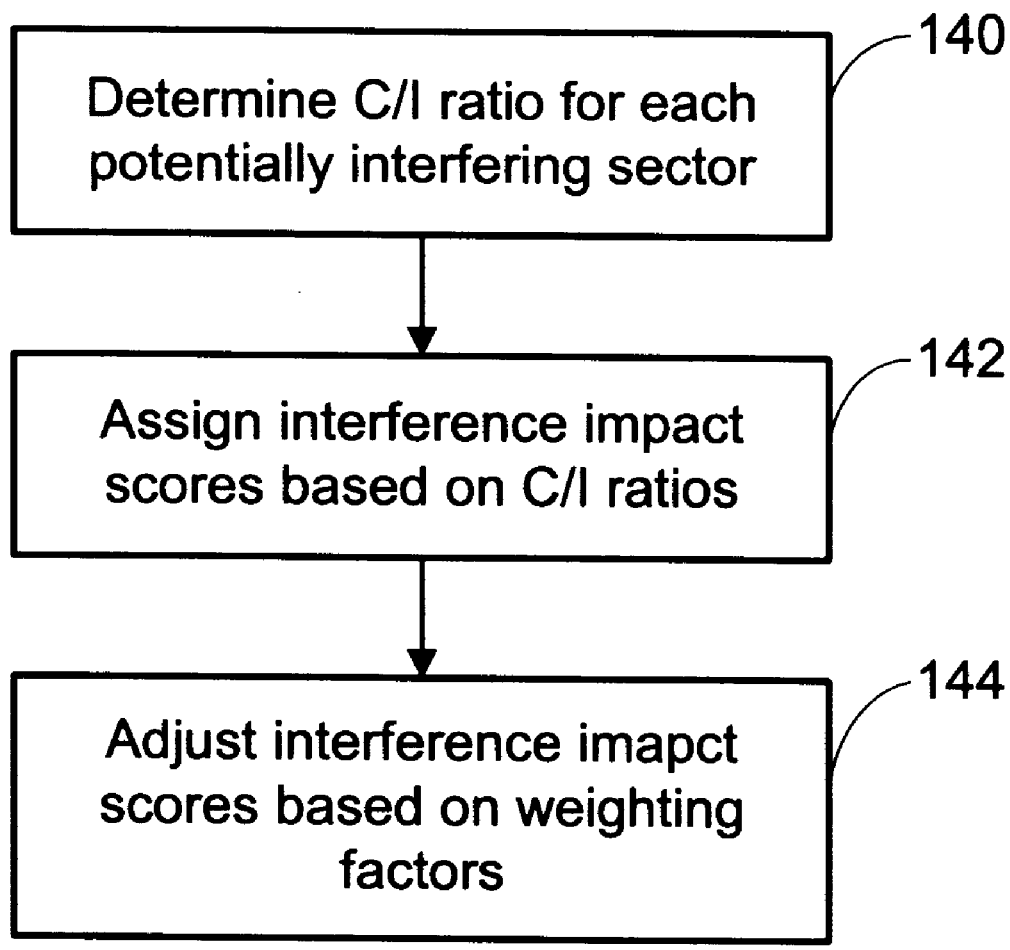
FIG. 6 is a flow chart illustrating a process for determining the potential interference impact of incident signals in a pixel from each of the other sectors in the network.

Referring back now to FIG. 4, once the system determines which is the serving sector for each pixel the system begins with an analysis of the potential interference impacts between signals from each of the other non-serving sectors in the network with that pixel's serving sector, step 108. As shown in FIG. 6, the process for determining the potential interference impact of signals begins with determining the carrier-to-interference (C/I) ratios for each potentially interfering sector, step 140. Typically, these C/I values are calculated in decibels ("dB"). A large C/I ratio indicates a signal that is substantially isolated from channel interference while a small C/I ratio indicates a signal having substantial channel interference. Thus, large C/I ratio values between conventional cellular base stations that are, for example, greater than approximately 18 dB, indicate that such base stations can use the same channel while small C/I ratio values between base stations, such as, for example, less than approximately 12 dB, indicate that substantial interference will probably occur between those two base stations when using the same or adjacent frequency channels. The specific C/I values are determined typically by the type of air interference technology used (GSM Vs TDMA, for example) and the service parameters the operator may want to use.

The system of the present invention maintains a user modifiable table which develops a quality impact "score" with respect to the determined C/I. For example, in an exemplary embodiment as shown below in Table 1, the quality impact score will range from zero to ninety-nine, with zero representing no perceptible quality impact and ninety-nine representing severe interference virtually certain to result in a dropped call. In a more specific example, a score of 0 is assigned for a potential interferer in pixels where C/I is determined to be above 17 dB and a score of 99 for a potential interferer in pixels where C/I is determined to be below 9 dB.

TABLE 1

| Impact Score | C/I (dB) |
| --- | --- |
| 0 | 18 |
| 50 | 13 |
| 99 | 8 |

As shown in FIG. 6, using the C/I scoring table shown and described above, the system will then assign an interference impact score for each potential interfering sector in each pixel in the network, step 142. Referring again to FIG. 6, these interference impact scores are then adjusted according to various weighting factors, step 144.

In one preferred embodiment, the system uses weighting factors which are specified by the user. In particular, the system allows identification of areas within the network service area in which sensitivity to call quality is particularly high and other areas where such sensitivity is relatively low. For example, areas frequented by top government officials may be designated as "high" sensitivity and low traffic pedestrian areas may be designated as "low" sensitivity. In this embodiment, the system also allows identification of specific areas within the network service area in which peak time call volume, preferably on a per-pixel basis, is anticipated to be significantly higher than average, and other specific areas where such anticipated call volume is relatively low. For example, sections of major highways where vehicular traffic routinely backs up during "rush hour" might generate much higher than average peak time call volumes, so the user might designate such areas as "high" call volume per pixel. "Low" call volume per pixel designated areas may be locations such as side roads located in rural townships where activity is minimal. The user may use a number of different sources of information to provide; such weighting factors, such as traffic reports, call logs from past activities in certain areas, and consumer feedback reports which may indicate areas where communication services may be currently deficient. Once these weighting factors are provided by the user, the system adjusts the interference impact scores accordingly, in line with the weighting factors.

The following pseudo-code demonstrates the basic logic for determining a single impact score between sectors:

```
define the local interferer index function using the tables matching the
current network technology, the tables assigning a local impact for each
co-channel C/I and a potentially different local impact to each
adjacent channel C/I
For current_server = {sectors in the network} {
  for current_interferer = {sectors in the network ! =
  current_server} {
    for current_point = {points in which the traffic uses
    current server in non zero probability} {
      compute the C/ I of the current_server and
      current_interferer at the current_point using the RF
      propagation information.
```

```
compute the cochannel and adjacent channel local
interference indices.
}
use an integration policy to collect all the local interference
indices to a single impact between current_server and
current_interferer.
}
}
```

In the above pseudo-code, a pixel by pixel analysis is undertaken for each serving sector (current_server) and each interfering sector (current_interferer) in the current pixel being examined. For each pixel (current_point), the C/I is computed for that specific pixel's serving sector and each of the other interfering sectors in the network service area (sectors in the network !=current_server). In one embodiment, the C/I will be computed using the RF propagation information which may be simple predicted RF propagation information or alternatively, sampled RF information and/or the RF information merged with empirical data. Once the C/I of the current_server and current_interferer is computed, the co-channel and adjacent channel local interference indices are computed from the computed C/I at the current_point. In the present embodiment, the local interference index is a measure of the user dissatisfaction from experiencing a given C/I in a given technology. Once the local interference indices are calculated, the system uses an integration policy to collect or combine all the local interference indices to generate an impact score between the current_server and current_interferer for that given pixel. This combination of local interference indices can be done using traffic normalized summation, maximization, prioritized weighted summation, or other variants.

Figure 7:
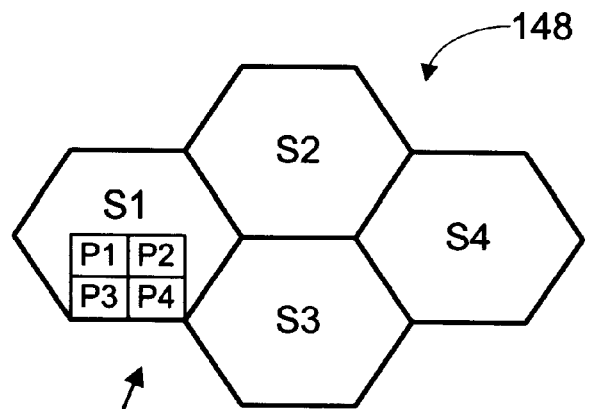
FIG. 7 illustrates how overall impact scores are determined for the impact matrix.
Figure 7:
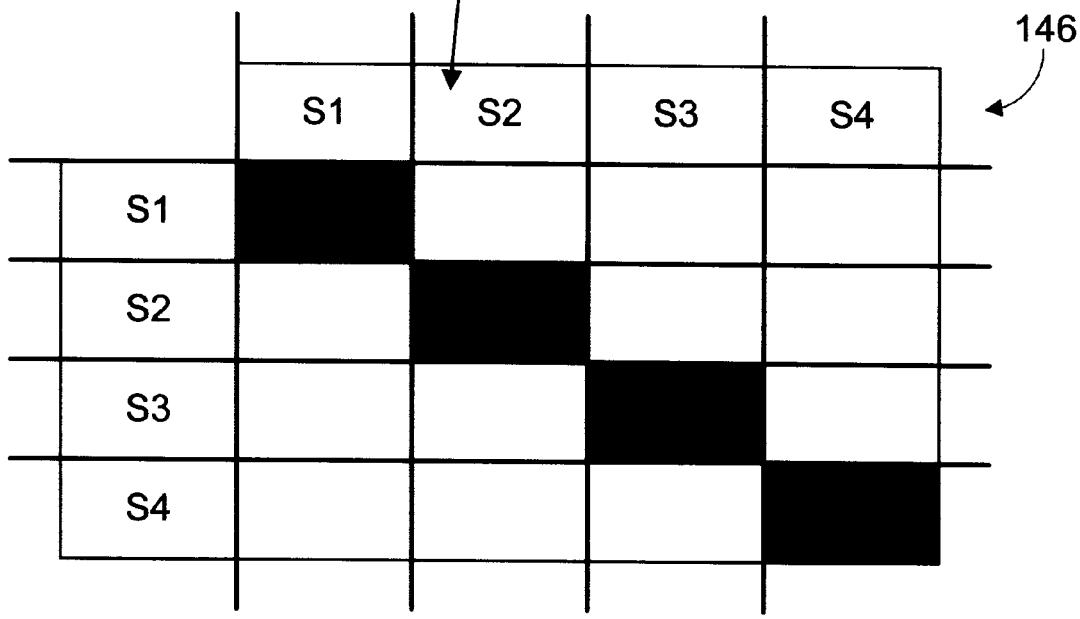

The system has now created a weighted pixel-by-pixel characterization of potential interference impacts in the network service area. From this impact information, the system generates an impact matrix 146, as shown in FIG. 7. In the impact matrix 146, each of the columns represents a specific sector in the network acting as the serving sector. Each of the rows represents a specific sector in the network acting as an interfering sector. Thus, an entry in the impact matrix will represent the overall signal quality impact in areas served by a specific sector which would be caused by making co-channel or adjacent channel assignments in another sector. Typically, the higher the score in the impact matrix, the more of an impact a co-channel or adjacent channel assignment will have for that specific sector pair.

To generate an overall impact score for the impact matrix, the system considers all of the weighted interference impact scores as determined above for each pixel. In one embodiment, the system performs a weighted sum integration to generate the impact matrix from the scores. Referring to FIG. 7, for each sector $S_1$ $S_2$, $S_3$, and $S_4$. in a network service area, the system considers all of the pixels for which a specific sector, say $S_1$ is the serving sector. For example, if sector $S_1$ is the serving sector for pixels $P_1$, $P_2$, $P_3$ and $P_4$, then the weighted interference impact scores for pixels $P_1$, $P_2$, $P_3$ and $P_4$ are considered in generating an overall impact score for that sector $S_1$ and its potentially interfering sectors, such as $S_2$, $S_3$, and $S_4$. For example, for each pixel, weighted interference impact scores have been determined between each pixel serving sector and each of the other non-serving sectors $S_2$, $S_3$, and $S_4$ ($S_1$ v.$S_2$; $S_1$ v. $S_3$; $S_1$ v.$S_4$). Based on the weighted interference impact scores, the system determines an overall impact score for sector $S_1$ with respect to sectors $S_2$, $S_3$, and $S_4$. For example, considering sector $S_1$ to be the exemplary serving sector and sector $S_2$ to be the interfering sector, the system will examine the weighted interference impact scores for pixels $P_1$, $P_2$, $P_3$ and $P_4$ with respect to sector $S_2$, namely $P_1$ ($S_1$ v.$S_2$), $P_2$ ($S_1$ v.$S_2$), $P_3$ ($S_1$ v.$S_2$) and $P_4$ ($S_1$ v.$S_2$). These weighted interference impact scores for pixels $P_1$, $P_2$, $P_3$ and $P_4$ with respect to sector $S_2$ are then combined and weighted to generate an overall impact score for sector $S_1$ as the serving sector and sector $S_2$ as the interfering sector. This overall impact score will then be placed into the impact matrix under the column sector $S_1$ and in the row sector $S_2$. The remaining spaces in the impact matrix are populated as described above. Typically, the spaces in the impact matrix where the serving sector and the interfering sector are the same sector remain blank, since the same sector will not be able to interfere with itself in practice.

The following pseudo-code demonstrates one set of logic behind consolidating various layers of information and data into a single overall impact matrix:

```
input:
layers[the_layer] [sector1] [sector2]- the impact between sector1 and
sector2 in layer the_layer.
weight_from[the_sect] [layer]: the weight associated to impacts from
sector the-sect with regard to the layer.
weight_to[the_sect] [layer]: the weight associated to impacts to sector
the_sect with regard to the layer.
Output: the unified im - im[sector] [sector]
for s1 = {set of sectors} {
for s2 = {set of sectors} {
im[s1, s2]=
merging_func(s1, s2, {layers[0] [s1] [s2], layers[1] [s1] [s2], . . })
}
}
merging_func(s1, s2, {entry1, entry2, . . . }) =
summ(i, weight_from[s1] [i]* weight_from[s2] [i]* entry [i])
```

In consolidating all the signal and interference data into a single impact-matrix, the system accepts input, such as the interference impact scores for specific areas (sector1, sector2) of the network service area, as was determined above. These impact scores thereby form a "layer" (the_layer) of data for consolidation into the single impact matrix. Such data may also be weighted, for example, by specifying which areas within the network service area are sensitive or are "high" call volume areas. The interference impact scores and associated weightings are then processed by the system (merging_func) and outputted into a unified impact matrix.

One skilled in the art will recognize that the overall impact matrix may be generated in many different ways and still achieve the objectives of the present invention. For example, in a more general example of an integration technique, arbitrary logical expression is defined that takes a set of layer values 1M_sect1_sect2_layer_i and an output is generated by applying the logical expression to the inputs. Having, for example, two input layers drive_test and heuristic, the system generates the impact matrix using the following expression:

```
If (heuristic >0)
    return heuristic
else
    return drive_test
```

Further embodiments involving combinations of logical expressions and weighted sums are available, as will be understood by those skilled in the art after reviewing this description.

Figure 8:
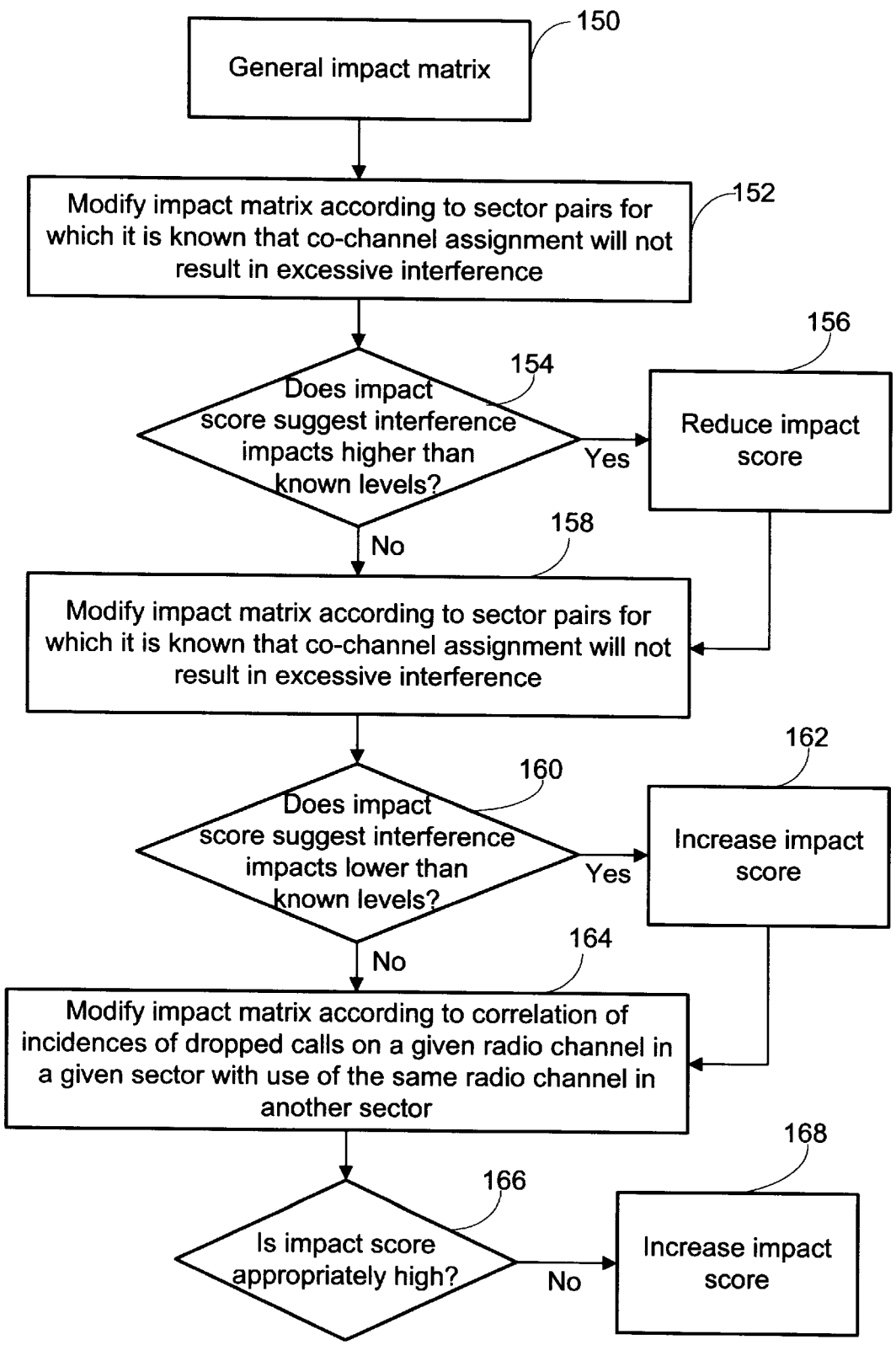
FIG. 8 is a flow chart illustrating a process for modifying the impact matrix.

Referring now to FIG. 8, once the impact matrix is generated, step 150, the impact scores may be adjusted to further accurately represent potential impacts of channel assignments. The scores may be adjusted according to the data which defines sector pairs for which it is known that channel assignment, either co-channel or adjacent channel, will not result in excessive interference, step 152. If the impact scores in the impact matrix suggest interference impacts higher than the known levels, step 154, the scores in the matrix are reduced accordingly, step 156.

The impact scores may also be modified in accordance to data which defines sector pairs for which it is known that channel assignment, either co-channel or adjacent channel, will result in excessive interference, step 158. If the impact scores in the impact matrix suggest interference impacts lower than the known levels, the scores in the matrix are increased accordingly.

Additionally, the system may adjust the scores in the impact matrix based on data input which contains call detail information, such as information which correlates incidences of dropped calls operating on a given radio channel in a given sector with simultaneous use of the same (or adjacent) radio channel in another sector, step 164. When a high correlation of these factors is found, it is assumed that there is a causal relationship in that the dropped calls in one sector are likely caused by interference from the other sector. In this case, the system examines the corresponding impact score in the impact matrix, step 166. If this score is not already appropriately high, it is then increased to a high value, step 168.

Typically, the system will accept the following inputs prior to the creation of the impact matrix: files containing or implying lists of co-channel and/or adjacent channel pairing relationships among various sectors which are known to provide low levels of excessive interference; files containing or implying lists of co-channel and/or adjacent channel pairing relationships among various sectors which are known to provide high levels of excessive interference; files which provide details of call records for the network for some period of time including: for each incidence of a dropped call: the precise time of the call drop; the RF channel in use by the call when the drop occurred; and the serving sector of the call when the drop occurred; for each call handled during the period covered by the data: the time the call began; the initial RF channel assigned; the initial serving sector; the time, target sector, and new RF channel assignment for each handoff; and the time the call ended.

In a typical cellular communication network, call detail information as discussed above may be extracted from switches within the network communications system which maintain log files that track various attributes, such as dropped calls, severe C/I events, uplink noise, failed handoffs and other related, events. Call detail information may also be extracted from performance monitoring systems such as WantMark's Flex-PM, ADC's Metrica, and MSI's MAXXER.

Once modifications to the impact matrix, as described above, are complete, the impact matrix is used to assist the system engineer in designing and optimizing a frequency plan for the network, wherein the object is to assign channels to each cell or sector in the numbers required while keeping the total quality impact associated with these assignments to the lowest possible value.

Figure 9:
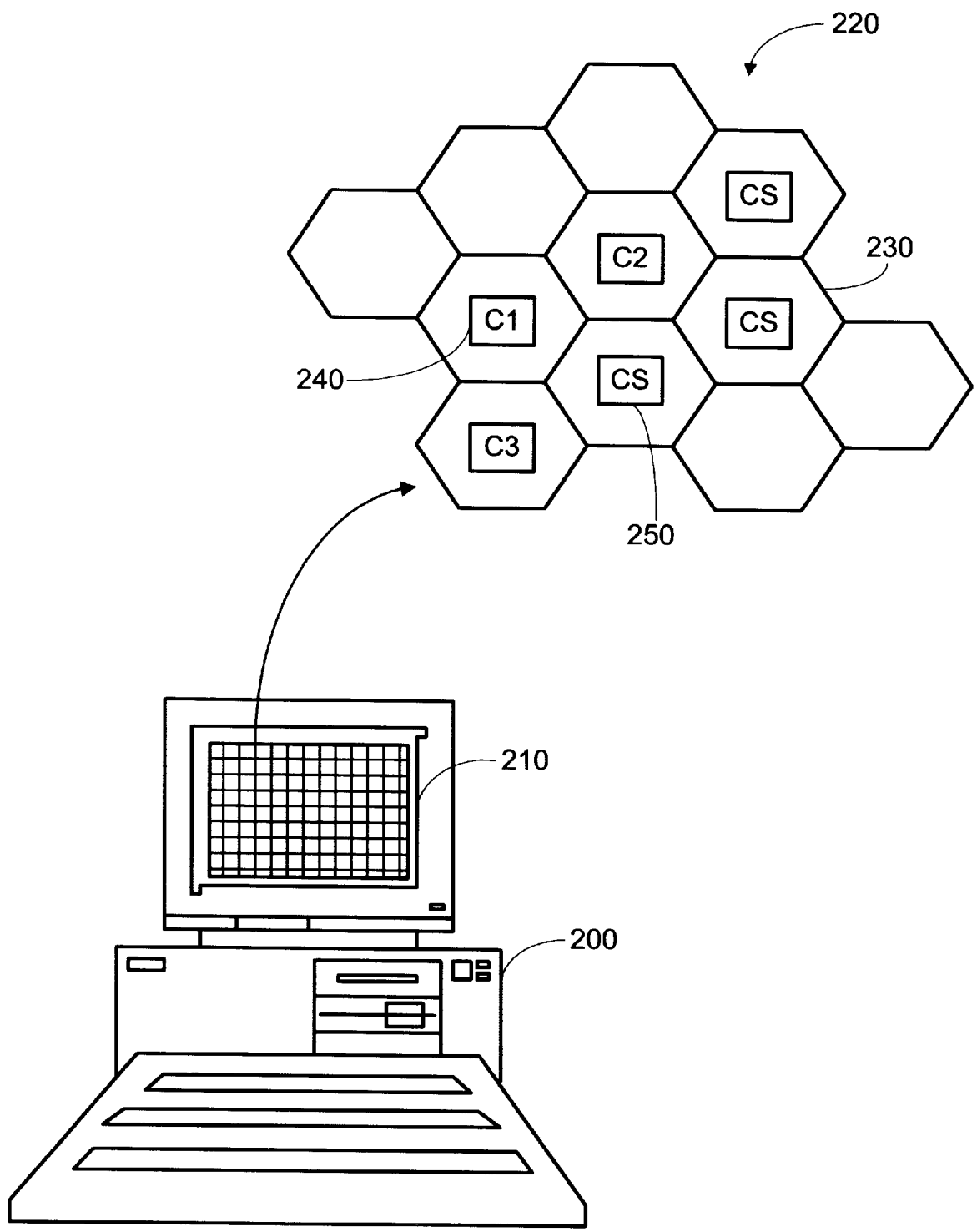
FIG. 9 illustrates a computer system using an impact matrix of the present invention for frequency channel planning in a network service area.

As shown in FIG. 9, the methods and systems of the present invention may be incorporated in software stored on a computer usable medium such as a hard or floppy disk, CD-ROM, or other electrical, magnetic, or optical memory device adapted for use on a computer system 200. Additionally, the methods or systems may also be incorporated in hardware elements such as specially designed integrated circuits, as is known in the art. The computer system 200 may provide for the calculation, processing and generation of an impact matrix 210 in accordance with the teachings of the present invention. The impact matrix 210 may be used for frequency planning within a network service area 220 made up of cells or sectors 230. The impact matrix 210 would provide guidance on how to make specific channel assignment 240 and/or channel set assignments 250 within each cell or sector 230. For example, if a user desired to change an existing channel assignment within the network service area 220, the user would consult the impact matrix 210 to determine the impact of changing the channel assignment.

In other embodiments, the system would "score" a given frequency plan, or a given modification thereto, by applying the impact matrix's scores to the individual channel assignments in the plan or modification. For example, if a system engineer needs to add an RF channel to a particular sector to accommodate growth in peak call volume, he or she can consider. a particular channel assignment. The impact matrix will provide the incremental quality degradation that such an assignment will cause within that sector's service area and in the service areas of each co-channel or adjacent channel sector.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

What is claimed is:

1. A method of generating an impact matrix for use in allocating frequency channels in a wireless communication network service area, the network area divided into a plurality of sectors which are further divided into a plurality of pixels, the impact matrix providing impact scores which characterizes sector by sector channel interference in the network service area, the method comprising:

merging signal propagation analysis data and empirical measurement data to determine an anticipated signal level for each one of the plurality of pixels in the network service area;

determining which one of the sectors in the network service area is a serving sector for at least one of the pixels;

determining channel interference impact scores for the pixel based on the interference between the pixel's serving sector and each of the other sectors in the network service area; and providing sector by sector channel interference impact scores.

2. The method of claim 1, wherein merging propagation analysis is performed according to user ascribed confidences.

3. The method of claim 1, wherein determining channel interference impact scores between the pixel's serving sector and signals from each of the other sectors in the network service area comprises:

calculating ratios between a signal from the serving sector and signal levels from each of the other sectors in the network service area;

assigning un weighted interference impact scores based in part on the calculated ratios; and adjusting the unlighted interference impact scores according to user assigned variables.

4. The method of claim 3, wherein the user assigned variables comprise network area sensitivity to call quality and amount of call volume for that network service area.

5. The method of claim 1, further comprising modifying the channel interference impact scores in the impact matrix according to channel pairing relationships among sectors which are known to provide high levels or low levels of interference.

6. The method of claim 5, further comprising modifying the channel interference impact scores in the impact matrix according to detailed call history information.

7. The method of claim 6, wherein the detailed call history information includes dropped call information.

8. A system for developing an impact matrix for use in frequency channel planning in a wireless communication network service area, the communication network service area divided into sectors and pixels, the system comprising:

means for determining a signal strength level for each pixel in the network service area;

means for determining which of the sectors is a serving sector for each pixel in the network service area;

means for determining an interference impact score between each pixel's serving sector and each of the other non-serving sectors in the network service area; and means for determining overall sector by sector interference impact scores for inclusion in the impact matrix, the overall sector by sector interference impact scores based on the interference impact sores for the pixels within which a sector is the serving sector.

9. The system of claim 8, wherein the means for determining a signal strength for each pixel in the network service area comprises means for conducting a propagation analysis and means for performing empirical measurements.

10. The system of claim 8, wherein the means for determining an interference impact score between each pixel's serving sector and each of the other non-serving sectors in the network service area comprises:

means for calculating for each of the other non-serving sectors in the network service area, a ratio between the signal strength level from the serving sector and a signal strength level from each of the other non-serving sectors;

means for assigning interference impact scores for each of the non-serving sectors; and means for weighting the interference impact scores.

11. The system of claim 10, wherein the means for weighting the interference impact scores comprises means for allowing a user to specify sensitive areas within the communication network service area.

12. The system of claim 11, wherein the means for weighting the interference impact scores comprises means for allowing the user to specify areas having high or low call volume within the communication network service area.

13. The system of claim 8, further comprising means for modifying the impact matrix based on data which specifies co-channel assignments which will not result in excessive interference.

14. The system of claim 13, further comprising means for modifying the impact matrix based on data which specifies co-channel assignments which will result in excessive interference.

15. The system of claim 14, further comprising means for modifying the impact matrix based on data which specifies adjacent channel assignments which will not result in excessive interference.

16. The system of claim 15, further comprising means for modifying the impact matrix based on data which specifies adjacent channel assignments which will result in excessive interference.

17. The system of claim 16, further comprising means for modifying the impact matrix based on call detail information.

18. The system of claim 17, wherein the call detail information includes at least one of the following: time of call drops, channel in use by dropped calls, serving sectors of dropped calls, time dropped calls began, initial channel assigned to dropped calls, initial serving sector of dropped calls, call handoff information and time calls ended.

19. The system of claim 8, wherein the impact matrix allows a user to make and evaluate individual channel assignments in the communication network service area.

20. A computer implemented process for creating an impact matrix for use in allocating channels in a wireless network which is divided into sectors, the impact matrix constructed based on a pixel by pixel analysis of signal interference within the network, the process comprising:

determining a serving sector for at least one pixel in the network;

determining weighted interference impact scores for the at least one pixel, the weighted interference impact scores based upon each of the non-serving sectors' interference impact upon the at least one pixel s serving sector; and determining overall impact scores based upon the weighted interference impact scores for the at least one pixel.

21. The process of claim 20, wherein determining a serving sector for the at least one pixel in the network comprises merging propagation analysis and empirical data according to user ascribed confidences.

22. The process of claim 20, wherein determining overall impact scores comprises, for all of the pixels in the network for which a specific sector is the serving sector, processing all of the weighted interference impact scores for those pixels based upon the interference impact between the pixels' serving sector and each of the other non-serving sectors in the network.

23. The process of claim 20, wherein:

the weighted interference impact scores are determined in accordance with weighting factors which account for at least one of sensitivity to call quality and call volume.

24. A computer readable medium containing a program which when executed on a computer causes the computer to perform a method for creating an impact matrix for use in frequency channel planning in a network service area which is divided into a plurality of pixels, the method comprising:

determining a serving sector for each of the plurality of pixels in the network service area;

determining weighted interference impact scores for at least a selected one of the pixels, the weighted interference impact scores based upon each of the non-serving sectors' interference impact upon the selected pixel's serving sector; and determining overall impact scores based upon the weighted interference impact scores, wherein the impact matrix characterizes the interference relationship between sectors in the network service area.

25. The computer readable medium of claim 24, wherein determining a serving sector for the at least one pixel in the network service area comprises merging propagation analysis and empirical data according to user ascribed confidences.

26. The computer readable medium of claim 24, wherein determining overall impact scores comprises, for all of the pixels in the network service area for which a specific sector is the serving sector, processing all of the weighted interference impact scores for those pixels based upon the interference impact between the pixels' serving sector and each of the other non-serving sectors in the network service area.

27. The computer readable medium of claim 24, wherein:

the weighted interference impact scores are determined in accordance with weighting factors which account for at least one of sensitivity to call quality and call volume.

28. A method for creating an impact matrix for use in allocating channels in a wireless network which is divided into sectors, the impact matrix constructed based on a pixel by pixel analysis of signal interference within the network, the method comprising:

determining a serving sector for at least one pixel in the network;

determining weighted interference impact scores for the at least one pixel, the weighted interference impact scores based upon each of the non-serving sectors' interference impact upon the pixel's serving sector; and determining overall impact scores based upon the weighted interference impact scores for the at least one pixel.

29. The method of claim 28, wherein:

determining a serving sector for the at least one pixel in the network comprises merging propagation analysis and empirical data according to user ascribed confidences.

30. The method of claim 28, wherein:

determining impact scores comprises, for all of the pixels in the network for which a specific s he serving sector, processing all of the weighted interference impact scores for those pixel based upon the interference impact between the pixels' serving sector and each of the other non-serving sectors in the network.

31. The meted of claim 28, wherein:

the weighted interference impact scores are determined in accordance with weighting factors which account for at least one of sensitivity to call quality and call volume.

32. A system for creating an impact matrix for use in allocating channels in a wireless network which is divided into sectors, the impact matrix constructed based on a pixel by pixel analysis of signal interference within the network, comprising:

means for determining a serving sector for at least one pixel in the network;

means for determining weighted interference impact scores for the at least one pixel, the weighted interference impact scores based upon each of the non-serving sectors' interference impact upon the pixel's serving sector; and means for determining overall impact scores based upon the weighted interference impact scores for the at least one pixel.

33. The system of claim 32, wherein:

the means for determining a serving sector for the at least one pixel in the network comprises merging propagation analysis and empirical data according to user ascribed confidences assigned to the data.

34. The system of claim 32, wherein:

the means for determining overall impact scores comprises, for all of the pixels in the network for which a specific sector is the serving sector, processing all of the weighted interference impact scores for those pixels based upon the interference impact between the pixels' serving sec d each of the other non-serving sectors in the network.

35. The system of claim 32, wherein:

the weighted interference impact scores are determined in accordance with weighting factors which account for at least one of sensitivity to call quality and call volume.

36. A method of allocating frequency channels in a wireless communication network service area which is divided into a plurality of sectors which are further divided into a plurality of pixels, comprising:

determining respective anticipated signal levels for respective ones of the pixels by merging associated signal propagation analysis data and empirical measurement data;

for respective ones of the pixels, determining which of the sectors in the network service area is a serving sector therefore based on the respective anticipated signal level, and determining channel interference impact scores based on interference caused by other ones of the sectors in the network service area; and generating data for use in an impact matrix based on the respective channel interference impact scores which characterizes sector by sector channel interference in the network service area;

wherein the impact matrix data is adapted for use in allocating the frequency channels in the network service area.

37. A system for allocating frequency channels in a wireless communication network service area which is divided into a plurality of sectors which are further divided into a plurality of pixels, comprising:

means for determining respective anticipated signal levels for respective ones of the pixels by merging associated signal propagation analysis data and empirical measurement data;

means for determining, for respective ones of the pixels, which of the sectors in the network service area is a serving sector therefore based on the respective anticipated signal level, and for determining channel interference impact scores based on interference caused by other ones of the sectors in the network service area; and means for generating data for use in an impact matrix based on the respective channel interference impact scores which characterizes sector by sector channel interference in the network service area;

wherein the impact matrix data is adapted for use in allocating the frequency channels in the network service area.

* * * * *